United States Patent [19]
Floro

[11] Patent Number: 5,410,717
[45] Date of Patent: Apr. 25, 1995

[54] REMOVABLE FUNCTION CARD FOR A PROGRAMMABLE CONTROLLER PROCESSOR

[75] Inventor: William E. Floro, Willoughby, Ohio

[73] Assignee: Allen-Bradley Company, Inc., Milwaukee, Wis.

[21] Appl. No.: 674,826

[22] Filed: Mar. 22, 1991

[51] Int. Cl.$^6$ .......................... G06F 13/00; G06F 1/26
[52] U.S. Cl. .................................. 395/800; 364/948.4; 364/929.5; 364/DIG. 2
[58] Field of Search .............. 395/800, 275, 400, 375, 395/325, 550, 750; 364/948.4, 929.5, DIG. 2

[56] References Cited

U.S. PATENT DOCUMENTS

| | | | |
|---|---|---|---|
| 4,556,953 | 12/1985 | Caprio et al. | 395/325 |
| 4,750,136 | 6/1988 | Arpin et al. | 364/514 |
| 4,942,534 | 7/1990 | Yokoyama et al. | 364/468 |
| 4,945,448 | 7/1990 | Bremenour et al. | 361/383 |
| 4,964,038 | 10/1987 | Louis et al. | 395/275 |
| 5,031,109 | 7/1991 | Gloton | 364/478 |
| 5,038,320 | 8/1991 | Heath et al. | 395/275 |
| 5,237,690 | 8/1993 | Bealkowski et al. | 395/700 |
| 5,263,148 | 11/1993 | Jones, Jr. et al. | 395/500 |

FOREIGN PATENT DOCUMENTS

| | | |
|---|---|---|
| 0237883 | 9/1987 | European Pat. Off. . |
| 0314148 | 5/1989 | European Pat. Off. . |
| 0321325 | 6/1989 | European Pat. Off. . |
| 0356237 | 2/1990 | European Pat. Off. . |
| 0357361 | 3/1990 | European Pat. Off. . |
| 2640783 | 12/1989 | France . |

Primary Examiner—Alyssa H. Bowler
Assistant Examiner—John Harrity
Attorney, Agent, or Firm—Quarles & Brady

[57] ABSTRACT

A programmable controller is customized for a specific application by a function card inserted into a socket of a processor module on the controller. The function card can perform one or more tasks and may be used with different types of programmable controllers. Before the card can be used by a given programmable controller an initialization procedure must be performed to determine if the processor module and the card are compatible. As part of this procedure information about the operation of the given programmable controller is sent to the card. The card also contains functional information for each of its tasks the card provides. The functional information is sent to the processor module during the initialization procedure to enable the module to utilize the card.

7 Claims, 7 Drawing Sheets

FUNCTION CARD FUNCTION ADDRESS SPACE

FUNCTION CARD IDENTIFICATION ADDRESS SPACE

PROCESSOR MODULE OPERATIONAL DATA

16 BIT REGISTERS FOR DATA WRITTEN TO FUNCTION CARD

| | |
|---|---|
| 00H | CHIP SELECT SET UP |
| 01H | CLOCK SPEED |
| 04H | UNUSED |
| 05H | PARITY / DEVICE TYPE |
| 08H | FREE CYCLE TIME MSB |
| 09H | FREE CYCLE TIME LSB |
| 0CH | UNUSED |
| 0DH | UNUSED |

FIG. 5B

PROCESSOR MODULE OPERATIONAL DATA

8 BIT REGISTERS FOR DATA WRITTEN TO FUNCTION CARD

| | |
|---|---|
| 01H | CLOCK SPEED |
| 03H | CHIP SELECT SET UP |
| 05H | PARITY / DEVICE TYPE |
| 07H | UNUSED |
| 09H | FREE CYCLE TIME LSB |
| 0BH | FREE CYCLE TIME MSB |
| 0DH | UNUSED |
| 0FH | UNUSED |

FIG. 5C

FUNCTION DESCRIPTIVE INFORMATION

16 BIT REGISTERS FOR DATA READ FROM FUNCTION CARD

| | |
|---|---|
| 00H / 01H | FUNCTION TYPE |
| 02H / 03H | MAXIMUM DEVICE SPEED |
| 04H / 05H | FUNCTION SIZE |
| 06H / 07H | FUNCTION ACCESS TIME |
| 08H / 09H | EXTENDED TYPE BYTE 0 |
| 0AH / 0BH | EXTENDED TYPE BYTE 1 |
| 0CH / 0DH | UNDEFINED |
| 0EH / 0FH | UNDEFINED |

FIG. 5D

FUNCTION DESCRIPTIVE INFORMATION

8 BIT REGISTERS FOR DATA READ FROM FUNCTION CARD

| | |
|---|---|
| 01H | FUNCTION TYPE |
| 03H | MAXIMUM DEVICE SPEED |
| 05H | FUNCTION SIZE |
| 07H | FUNCTION ACCESS TIME |
| 09H | EXTENDED TYPE BYTE 0 |
| 0BH | EXTENDED TYPE BYTE 1 |
| 0DH | UNDEFINED |
| 0FH | UNDEFINED |

FIG. 5E

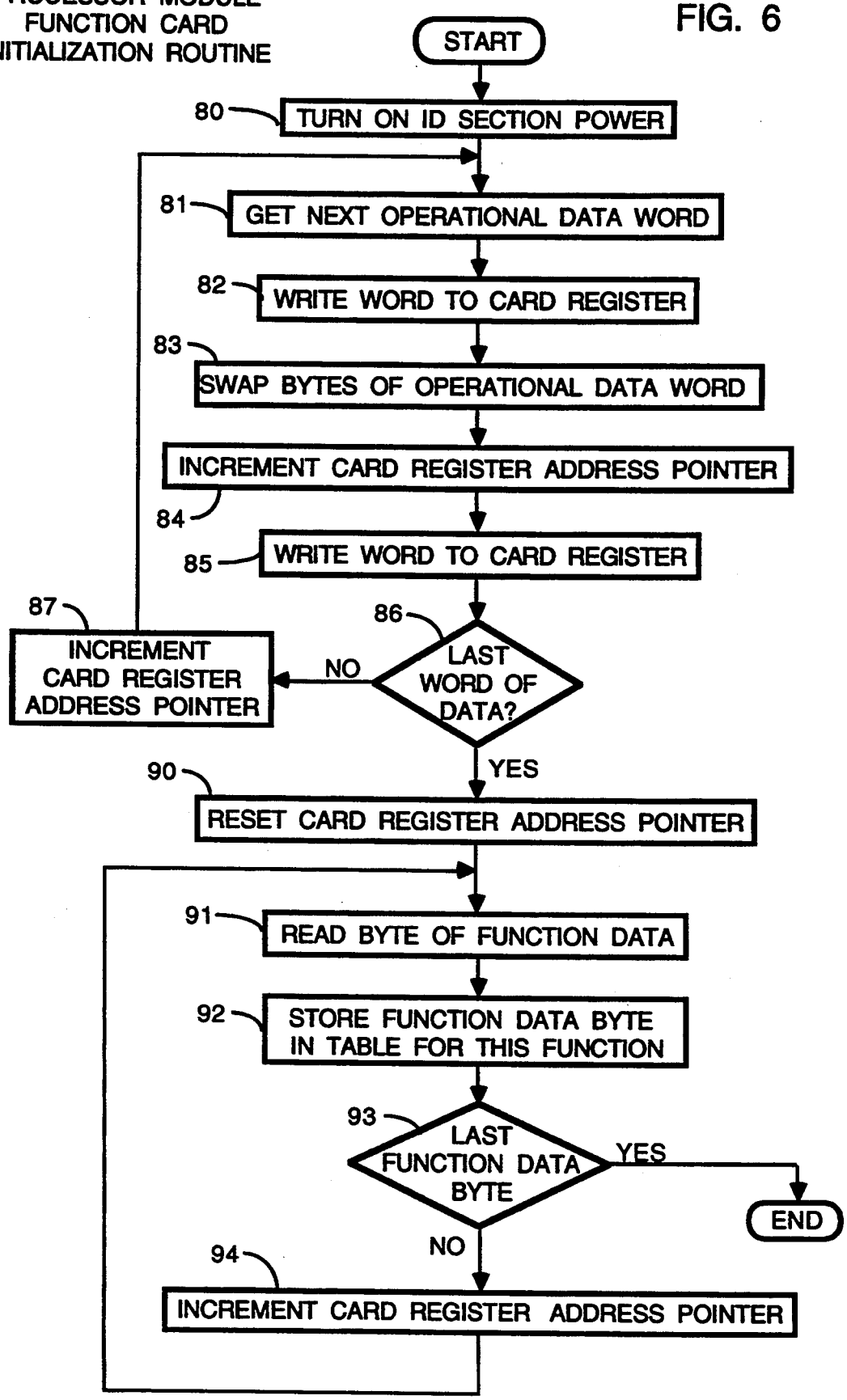

REMOVABLE FUNCTION CARD FOR A PROGRAMMABLE CONTROLLER PROCESSOR

The present invention relates to programmable controllers that govern the operation of industrial equipment, and more specifically to the processors for such programmable controllers which execute user defined control programs.

BACKGROUND OF THE INVENTION

Programmable controllers are a well known class of industrial computers for operating a wide variety of manufacturing equipment, such as assembly lines and machine tools, in accordance with a stored control program. The program comprises a series of process control instructions which are read out and executed to examine the condition of selected sensing devices on the controlled equipment, and to energize or deenergize selected operating devices contingent upon the status of one or more of the examined sensing devices.

The state of many sensing and operating devices can be represented by a single bit of data which is manipulated by the control program instructions. Other devices, such as position sensors, provide multiple bits of data representing a condition of the equipment being controlled. For these latter devices, instructions are provided to manipulate bytes and words of data representing the state of the sensing and operating devices. As used herein the term "byte" refers to eight-bits of data, and the term "word" refers to sixteen-bits, or two bytes, of data. Additional program instructions perform arithmetic operations, timing and counting functions, and complex statistical reporting operations. These instructions have become quite standardized in the industry and are directly associated with the elements of a ladder logic diagram which is easily understood by process control engineers.

As programmable controllers were applied to more complex manufacturing systems, multiple controllers were used to govern the operation of different portions of the system with each one executing a separate control program. In such applications, it becomes necessary for one programmable controller to exchange data regarding the manufacturing process with the other programmable controllers. Although techniques have been developed to communicate data among the programmable controllers, the coordination of several of these devices can become rather complex and complicated.

One of the attributes of programmable controllers is their modularity. The typical controller comprises a rack that holds and electrically connects a number of functional modules. These modules include a program processor, modules that receive signals from sensor and supply signals to actuators, and network communication modules. A programmable controller can be tailored to a specific application by choosing the necessary modules from a wide variety of different ones available for use.

With the advent of custom integrated circuits, greater functionality has been incorporated into the program processor module. For example, communication interface circuitry, which previously was provided in a separate module, is now part of the program processor module. With this greater functionality comes a need to be able to tailor a universal program processor module to a specific application. Such tailoring can provide increased memory space and custom firmware.

One way of fulfilling this need to tailor a program processor module is to store firmware for the custom functionality in non-volatile memory devices on a small removable printed circuit board. Because of its size and shape this type of printed circuit board is sometimes referred to as a "memory card". The memory card connects through the front panel of the program processor module so that the module's circuits can read the firmware stored on the card.

Since a large manufacturing plant has a number of programmable controllers with different versions of program processor modules, it is often necessary to be able to use a given function card with a variety of processor modules. Furthermore, a function card may be custom designed for a specific user and relatively expensive to replace should the user upgrade to a future generation of a programmable controller from the same manufacturer. Therefore a function card should be usable with subsequent generations of programmable controllers from the same manufacturer.

SUMMARY OF THE INVENTION

A programmable controller includes a processor module to execute instructions of stored control programs. Sensing and operating devices of the controlled equipment are connected to a plurality of input and output modules that are electrically coupled to the processor module. The processor module executes a series of user defined control programs which examine the status of selected sensing devices and set the state of the actuating devices in accordance with the examined status based on the logical operations defined by the control programs.

A function card containing circuitry for performing one or more functions of the programmable controller is removably connected to the components of the processor module. This connection is provided through a front panel of the processor module in the preferred embodiment. The function card has a memory that holds data regarding the operational characteristics of the function card. The processor module is able to read this data from the card to identify the type of functions provided by the card and to learn how to use those functions. Another memory holds data written to the function card which specify some of the operational characteristics of the processor module.

In one embodiment of the function card a unique data transfer acknowledge (DTACK) circuit configures its operation to the performance specifications of the processor module. This circuit uses information regarding the processor module's clock speed and the length of the interval between when the processor module requests data from the function card and when the module is able to receive the data. From this data the DTACK circuit can determine when to send a DTACK signal to the processor module, so that by the time the processor module responds to the signal, the data will be available. Thus, the processor will be set up to receive the data at the earliest time at which the data is available from the function card. Thus, the wait between when the card has the requested data available and when the processor can receive the data is minimized.

An object of the present invention is to provide a removable card which contains circuitry that performs one or more functions of a programmable controller processor module.

Another object is to incorporate a mechanism on the card that provides information regarding each function performed by the card so that the processor module can determine its compatibility with and how to use that function.

A further object is to provide a mechanism by which a function card can alter its operation to optimize performance with different kinds of processor modules.

A more specific object of the present invention is to provide a data exchange interface between the function card and the processor module which minimizes or eliminates the number of wait states during access to the function card.

Yet another object is for the function card to exchange information with the processor module that enables at least one of them to determine its compatibility with the other one.

BRIEF DESCRIPTION OF THE DRAWINGS

FIGS. 5A–5E are address maps of an identification section of two types of function cards;

FIG. 6 is a flowchart of a routine that initializes the function card; and

DETAILED DESCRIPTION OF THE INVENTION

Figure 1:
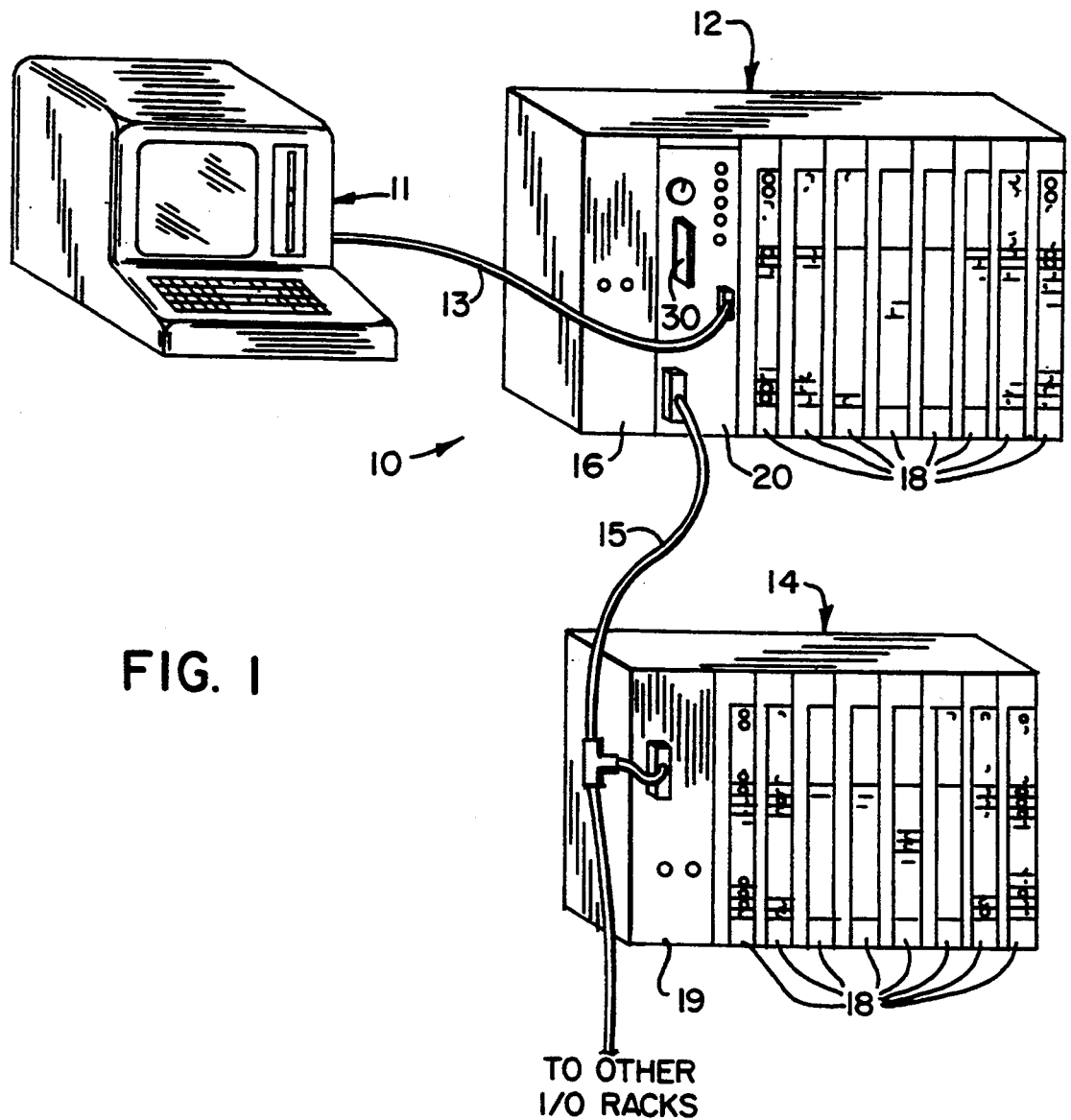
FIG. 1 is a pictorial representation of a programmable controller system which employs the present invention.

Referring to FIG. 1, a programmable controller system generally designated as 10 comprises a primary equipment rack 12 and a series of remote input/output (I/O) racks, such as rack 14, connected by a serial I/O network 15. A terminal 11 enables the user to program the controller 10 and monitor its operation.

The primary rack 12 houses a power supply 16, processor module 20 and a plurality of input/output (I/O) interface modules 18. The processor module 20 executes a user-defined control program that responds to signals from sensing devices on the controlled equipment by issuing signals to actuating devices on the same equipment. The sensing and actuating signals are coupled to the rack 12 through the input/output interface modules 18. The various modules 18 and 20 within the primary rack 12 are electrically interconnected by conductors on a backplane of the rack enabling data and control signals to be exchanged among the modules.

The processor module 20 receives programing instructions via the terminal 11 that is connected by cable 13 to a serial port connector on the front panel of the module. The serial I/O network 15 is coupled to a second connector on the front panel of the processor module 20 and to an adaptor module 19 in the remote I/O rack 14, enabling the processor module 20 to exchange data with another group of I/O modules 18 within the remote I/O rack. Alternatively, a local area network can be coupled to one of the connectors on the front panel of the processor module 20 enabling communication with a host computer and other programmable controllers coupled to that network.

A. Processor Module

Figure 2:
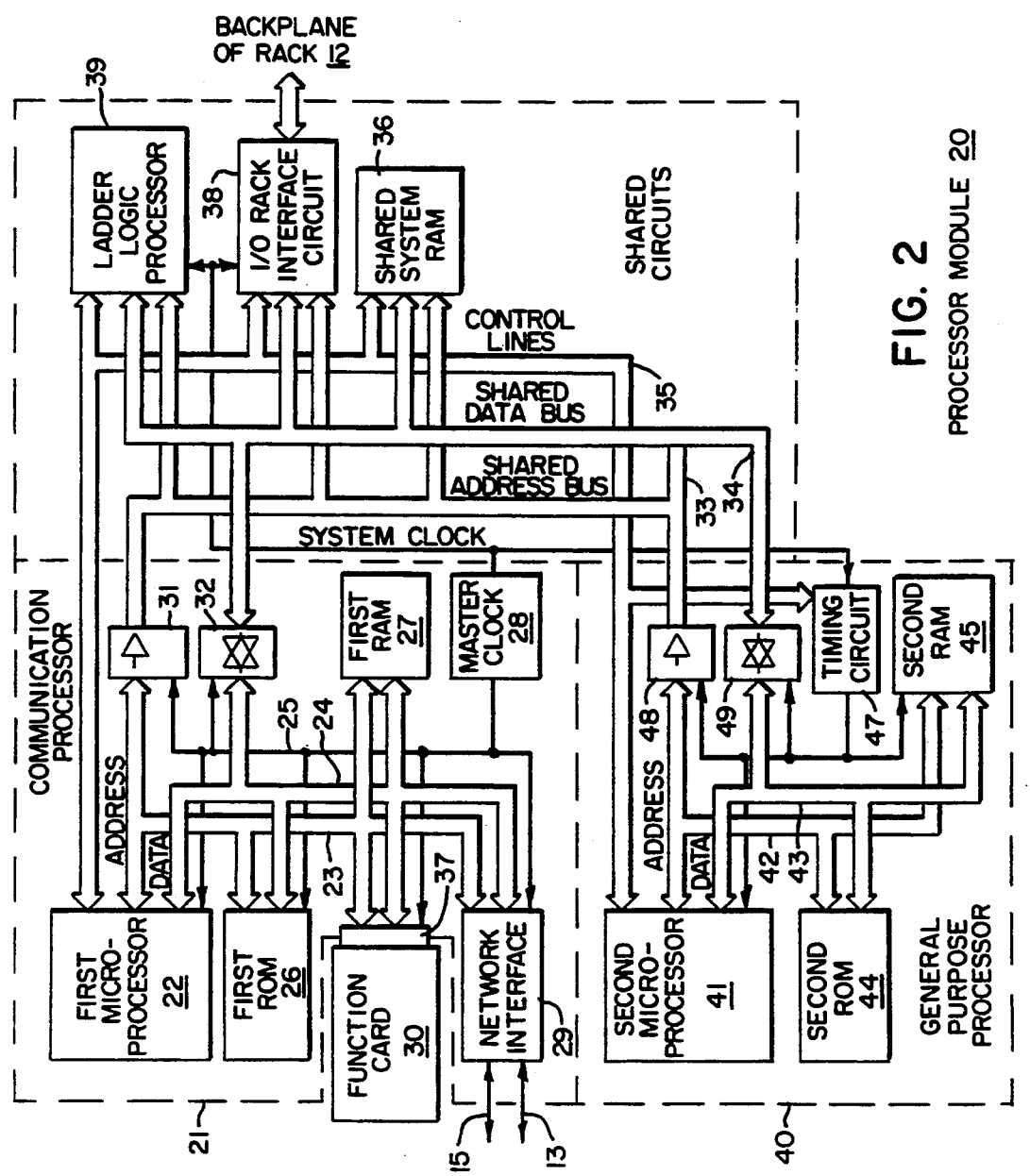
FIG. 2 is a functional block diagram of a processor module which forms part of the controller of FIG. 1.

With reference to FIG. 2, the processor module 20 includes a general purpose processor section 40 for user control program execution and a communication processor section 21 which handles the exchange of data over cable 13 and the serial I/O network 15. The processor module 20 also has a set of shared buses which connect these sections 21 and 40 with other data processing and storage components.

The communication processor section 21 is formed around a local address bus 23 and a local sixteen-bit wide data bus 24. Coupled to these buses is a first microprocessor 22 which may be a model 68000 manufactured by Motorola Inc. The first microprocessor 22 executes a program stored in a read only memory (ROM) 26 and utilizes a random access memory (RAM) 27 for data storage. A master clock circuit 28 provides a system clock signal to the other components of the processor module 20 as well as providing specific timing signals via control lines 25 to the components of the first communication processor section 21.

A major function assigned to the first microprocessor 22 is the control of communication with the programming terminal 11 and the serial I/O network 15. A communication link interface circuit 29 couples the local address and data buses 23 and 24 to the terminal cable 13 and to the remote I/O cable 15. The communication link interface circuit 29 translates the data between a parallel format used within the processor module and a serial format used to exchange data over terminal cable 13 and serial I/O network 15.

The local buses 23–25 of the first communication processor section 21 also are coupled to a connector 37. A removable, small printed circuit board, referred to herein as function card 30 extends through a opening in the front panel of the processor module 20 (as shown in FIG. 1) and has a mating connector that engages the bus connector 37. As will be described in detail the function card can take several forms one of which contains memory in which machine control programs are archived. An intelligent type of function card contains another microprocessor dedicated to performing a special data processing task such as handling communication over a wide area network connected to the card.

The communication processor section 21 is coupled to other processor module components through a set of tri-state address gates 31 and a set of bidirectional tri-state data gates 32. Specifically, the set of gates 31 couples the local address bus 23 to the module's shared address bus 33, and the set of data gates 32 couples the local data bus 24 to a sixteen bit wide shared data bus 34. A set of control lines 35 extends between processor module components and hereinafter is referred to as a control bus.

This connection of buses allows the first microprocessor 22 to write and read data to and from a shared system RAM 36 connected to the shared address and data buses 33 and 341. This memory 36 holds a conventional set of input/output data tables storing the status of sensing and operating devices on the machine controlled by the programmable controller. The user-defined control program is stored in another section of the shared system RAM 36. A further section of the shared system RAM 36 is used to contain system, processor module, and microprocessor level configuration data.

Referring still to FIG. 2, an I/O rack interface circuit 38 is connected to the shared address and data buses 33 and 34 and the backplane of primary rack 12. This interface circuit periodically scans the I/O modules 18 in the primary rack to gather input data from the sensors and send output data to the actuating devices. The scanning is accomplished in a manner similar to that employed by previous processor modules by sequentially sending control signals to each I/O module 18. These control signals cause input type modules to send sensor data over the backplane and cause output type modules to store data sent by the processor module 20. The data exchanged with the I/O modules 18 in the primary rack 12 are stored in the I/O data tables of the shared system RAM 36.

A ladder logic processor 39 also is coupled to the shared address and data buses 33 and 34. The vast majority of ladder control program instructions operate on a single bit or word of data. The ladder logic processor 39 has been designed to execute the subset of ladder diagram instructions which perform these basic control operations. This not only provides efficient execution of these instructions, it also frees the microprocessors in the module 20 to carry out other functions simultaneously with the control program execution.

Certain functions, such as immediate I/O module access, data block transfers to the I/O modules 18, and complex mathematical and logical operations cannot be performed by the ladder logic processor 39. These complex control program functions are executed in the general purpose processor section 40. This section 40 of the processor module 10 contains a second microprocessor 41 connected to its own isolated set of local address and data buses 42 and 43, respectively. This pair of local buses 42 and 43 couples the second microprocessor 41 to a second ROM 44 and a second random access memory 45. The ROM 44 stores the firmware which is executed by the second microprocessor 41 to carry out the complex ladder logic operations.

A timing circuit 47 receives the system clock signal and derives therefrom the necessary timing and control signals for the second microprocessor 41 and memories 44 and 45. A pair of tri-state transmission gates 48 and 49 isolate the local address and data buses 42 and 43 of the general purpose processor section 40 from the shared address and data buses 33 and 34. When these gates 48 and 49 are enabled in response to a command from the second microprocessor 41, the set of local buses 42 and 43 are electrically connected to shared buses 33 and 34. This enabling occurs only when the second microprocessor 41 has been granted access to the shared buses 33 and 34 by an arbitration circuit in the ladder logic processor 39.

B. Function Card Hardware

Figure 3:
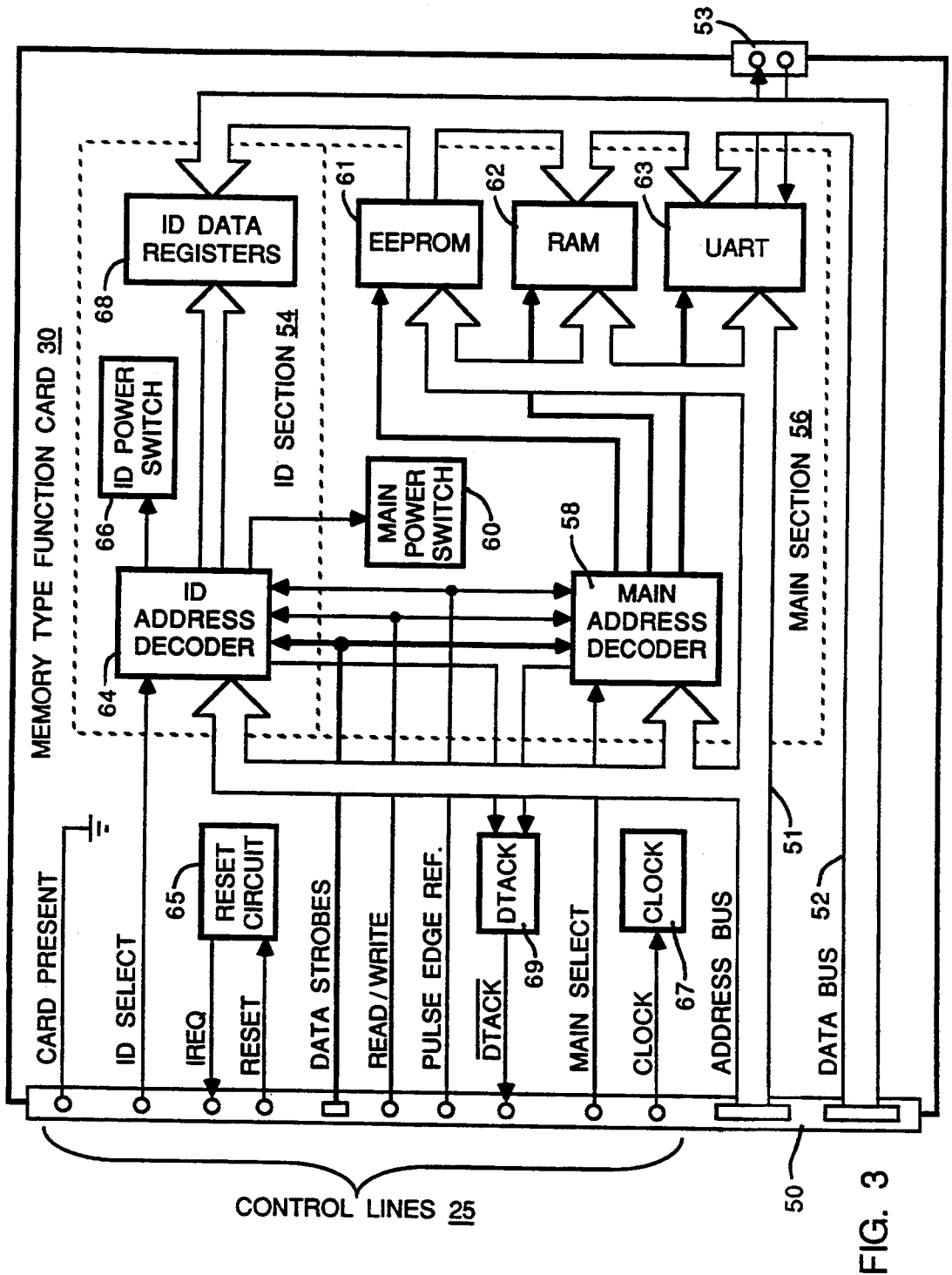
FIG. 3 is a functional block diagram of one type of a function card which can be used with the processor module.

With reference to FIG. 3, the memory card 30 has a connector 50 that mates with the connector 37 of the communication processor section 21 when the card 30 is inserted through a slot in the front panel of the processor module 20. A first group of terminal areas on connector 50 coupled to the control lines 25 within the communication processor section. Additional terminals on the memory card connector 50 couple an internal address bus 51 and internal sixteen-bit parallel data bus 52 to the address and data buses 23 and 24, respectively, within the communication processor section 21. This coupling of the memory card 30 to the buses 23, 24 and 25 allows the first microprocessor 22 in the processor module to interface with the function card.

Each function card may provide one or more different kinds of functions, such as read/write memory, read-only memory, a special purpose mathematical coprocessor or additional external communication interface circuits, to name but a few. The particular function card 30 illustrated in FIG. 3 includes three separate functions: non-volatile storage in an EEPROM 61, a random access memory (RAM) 62 and a serial communication interface 63. For example, non-volatile storage may hold user-defined control programs for the general purpose processor section 40 or programs to configure the communication section 21 for the particular protocol required by a network connected to the network interface circuit 29. The random access memory 62 enlarges the amount of storage available to the processor module, while the serial communication interface can couple the programmable controller 10 to other devices on a communication network.

The exemplary function card 30 is divided into a main section 56 which contains electronic circuits for the different functions, and an identification (ID) section 54 which stores operational information from the processor module 20 and information necessary to utilize the functions. The main section 56 has an address decoder 58 coupled to the card address bus 51. The main address decoder 58 is enabled by a signal on one of the control lines 25 designated MAIN SELECT. When enabled, the main address decoder 58 responds to addresses sent over bus 51 by issuing an enable signal to one of three function circuits 61, 62 and 63 that is being addressed.

When the EEPROM 61 is enabled by the signals from the main address decoder 58, the address on card bus 51 accesses storage location within the EEPROM causing the data stored therein to be sent onto the card data bus 52 and the internal data bus 24 of the processor module 20. RAM 62 similarly is enabled at other times by control signals from the main address decoder 58 either to store data sent over bus 52 into a location indicated by signals on the address bus 51, or to send previously stored data at that location onto the card data bus 52. The direction of data transfer is determined by a signal on the READ/WRITE control line. The serial communication interface comprises a universal asynchronous receiver/transmitter (UART) which is a conventional device that interfaces with a serial communication network attached to a connector 53 on the exposed edge of the function card 30.

Figure 4:
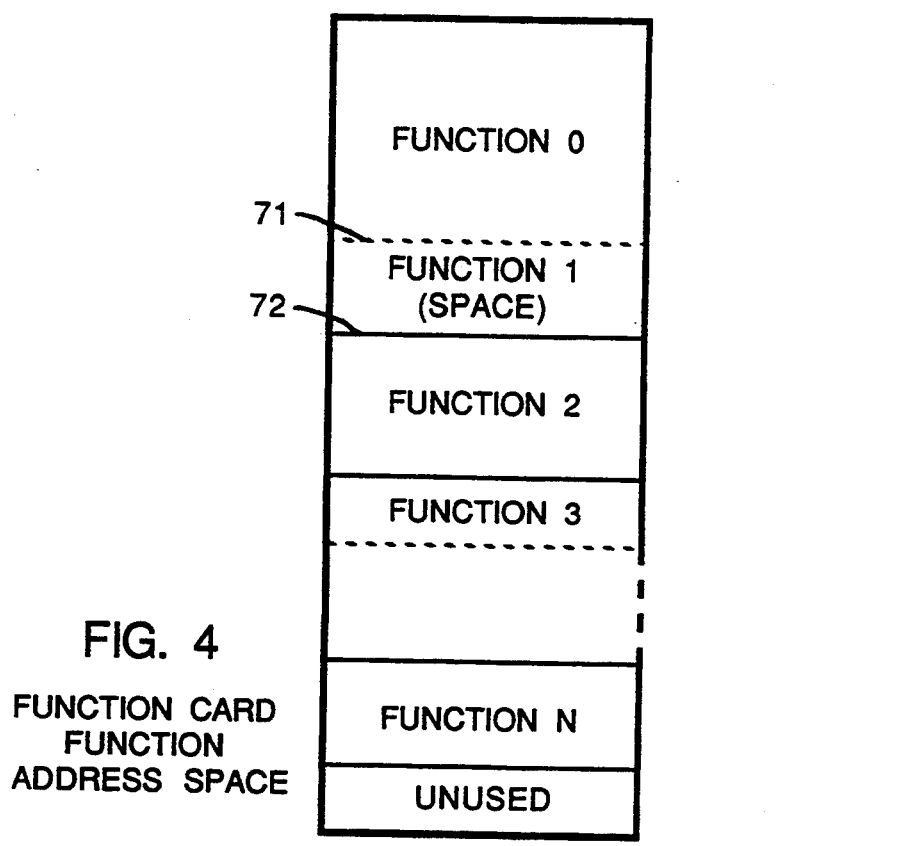
FIG. 4 is an address map of a main section of the function card shown in FIG. 3.

FIG. 4 depicts a map of the addresses allocated to the main section 56 of a function card. The address space is divided into sections with each section corresponding to a different function provided by the card or to space (unassigned addresses) between those functions. In the case of the function card depicted in FIG. 3, some of these addresses are assigned to EEPROM 61, RAM 62 and UART 63. Both kinds of memory sections, as well as the UART, are referred to as "Functions" with the space section being one type of function. A single function requiring many integrated circuits can occupy an entire card 30, which thus implements only one function.

As will be described in detail, some of the operational information bytes stored in the identification section specify the size of each Function in terms of the amount of address space allocated to it. The actual number of addresses used by a function can range from a few addresses to millions of addresses for memory type cards.

In order to cover this wide range of allocations in only a few bytes of stored data, the function size is specified in terms of the number of blocks of addresses. However, the actual addresses used by a given function may not end on the boundary of one of these blocks. In that case, the remaining addresses in the block are assigned to a space type function, so that the addresses for the next function will begin on the boundary of the next address block for ease of access. The space function is used in this manner to assure that all contiguous address locations before and between other functions on the memory card are accounted for. As a result, the first microprocessor 22 can calculate the beginning address of each function by keeping track of function sizes (including "space" sizes) and by knowing that Function 0 starts at address 00H.

For example, the addresses allocated to the EEPROM 61 are referred to as Function 0 in the memory map of FIG. 4 and do not end on an address block boundary, as designated by dashed line 71. As a result, a space type function (Function 1) is defined with a size so that it terminates on the next address block boundary which can be specified in the operational information. This termination on an address block boundary is designated by solid line 72. Function 2 corresponds to the RAM 62 and has an assigned section of addresses that terminates on an address block boundary that is specifiable by the stored function size operational information. Therefore, a space function is not required after Function 2 so that Function 3 corresponds to the UART 63. The number active and space type functions on a single card may vary from one to fifteen in the preferred embodiment, although a greater number could be accommodated.

Referring again to FIG. 3, the identification section 54 of the function card 30 contains a second address decoder 64, which is enabled by a control signal designated ID SELECT, present on another one of the control lines 25. The ID address decoder, when enabled, responds to unique addresses on card bus 51 by issuing power supply control signals to a main section power switch 60 or to an ID section power switch 66. These control signals open and close the two power switches 60 and 66 to apply and remove electrical power for components of the respective sections of the function card 30. The main section power switch 60 routes power to the components of the main section 56, while the ID section power switch 66 applies power to an assembly of data registers 68 within the ID section. Thus, the function card 30 conserves power by energizing only that section of the function card 30 which the first microprocessor 22 desires to access.

Figure 5A:
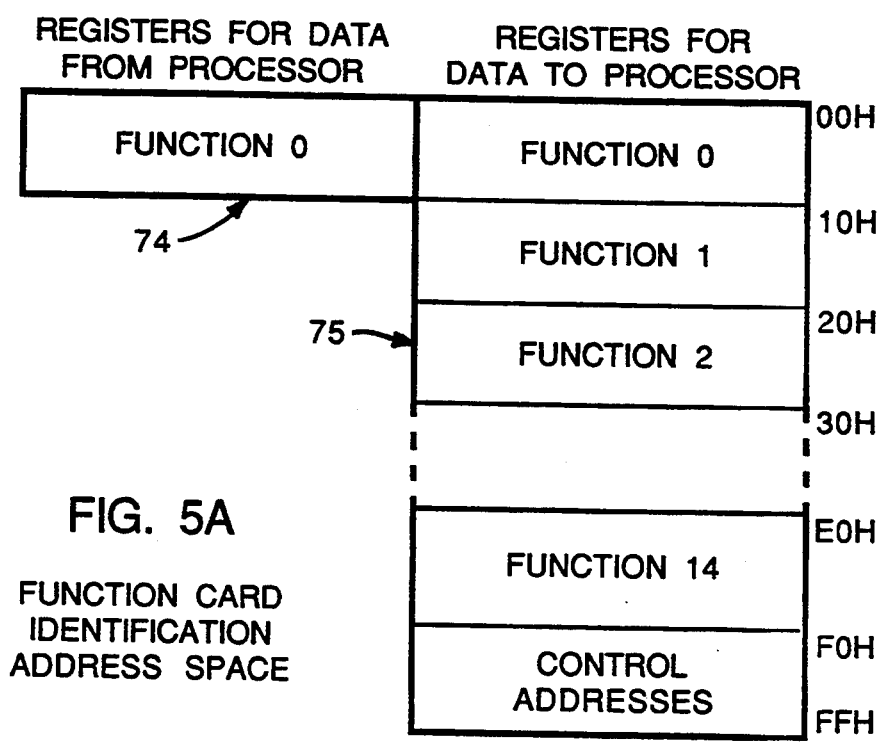

The ID address decoder 64 also responds to another range of addresses on bus 51 by producing control signals which activate the writing and reading of data to and from the ID data registers 68. With reference to FIG. 5A, 256 addresses (logical addresses 00H–FFH) are assigned to the assembly of ID data registers 68. The ID data registers 68 may be formed by either eight-bit wide storage devices or sixteen-bit wide storage devices. Sixteen-bit wide registers can store all sixteen-bits, the entire word, sent simultaneously over the card data bus 52, whereas eight-bit wide registers can only store one byte of the word on the card data bus 52. Operation of both kinds of function cards will be described and for that description the eight-bit wide registers will be assumed to be coupled to the least significant lines of the data bus.

The ID data registers 68 are divided into two groups; one group stores data written to the function card by the processor module and the other group stores data to be read by the processor module. For simplicity of reference these groups will be referred to herein respectively as "write only registers" 74 and "read only registers" 75, based on the type of access that the processor module may have to each set. The write only registers 74 form eight byte size storage locations contained within a range of addresses 00H–0FH, into which operational information is written by the first microprocessor 22. Although the processor module 20 cannot read data from the write only registers 74, the function card circuitry is able to read and utilize the data contained in this set of storage locations, as will be described.

The read only ID data registers 75 divide the 256 addresses of the ID section 54 into sixteen groups of sixteen addresses each. Fifteen of these groups are assigned for the fifteen possible functions (Functions 0–14) which may be defined on the card. Each group of read only register locations holds eight bytes of information which define how the first microprocessor 22 can utilize the corresponding card function. It should be noted that the addresses of the write only registers overlap with the group of addresses for Function 0 in the read only storage area. A conflict does not exist between these different registers as the READ/WRITE control signal activates only one of these areas at a time. The sixteen most significant addresses (logical addresses F0H-FFH) of the ID section 54 are used to control the operation of the card, such as the power switches 60 and 66. The contents of the different ID data registers and their use will be described hereinafter with respect to the operation of the entire function card.

As shown in FIG. 3, the memory type function card 30 also contains a clock circuit 67 which receives the system CLOCK signal from the master clock 28 in the processor module 20 and produces therefrom other timing signals (not shown) required by components of the function card. A data transfer acknowledge (DTACK) circuit 69 produces a conventional output control signal, also designated DTACK, which is used in transferring of data to and from the memory type function card. The DTACK signal is applied via connector 50 to one on the control lines 25.

The function card 30 also includes a reset circuit 65 which receives a RESET signal from the processor module 20 and issues reset signals to the different components within the function card to place those components in an initial state upon power-up of the programmable controller. After the function card 30 has been properly reset, the reset circuit 65 sends an interrupt request (IREQ) via one of the control lines 25 to inform the first microprocessor 22 of the successful completion of any initialization and diagnostic operations performed by the function card.

Another one of the control lines 25 is designated CARD PRESENT is pulled to ground when a card is inserted into connector 37 on the processor module. A low logic level on the CARD PRESENT signal line indicates the presence of a function card to the first microprocessor 22. Additional control lines can be provided as required for other types of function cards. The connectors 37 and 50 for the function card also have terminals for power supply lines, that are not illustrated.

C. Function Card Operation

When a function card 30 is inserted into the processor module 20 and power is applied to the programmable controller 10 by the user, an initial power-up sequence is performed by the processor module. This sequence detects that the CARD PRESENT control line is grounded, indicating that a device is coupled to connector 37 of the communication processor section 21. Even though the processor module 20 detects the presence of a function card, the reset circuit 65 in the function card must send an interrupt request on line IREQ within a fixed interval of time after the processor module issues and removes a system reset signal. If such an interrupt request is not received by the first microprocessor 22 within the allotted time period, the microprocessor considers that the function card is faulty and will not attempt to access the card. Furthermore, the function card 30 must remove the interrupt request either after a fixed interval of time or within a few microseconds of when the first access of the card by the processor module occurs. If the memory card 30 fails to remove the interrupt request in time, the first microprocessor 22 also considers the card to be faulty.

After the proper reset sequence has been verified by the function card, the first microprocessor 22 as part of its power-up sequence, executes a function card initialization routine depicted by the flowchart of FIG. 6. In the first step 80 of this routine, the first microprocessor 22 writes a word of data to a specifically defined address in the range of control addresses (F0H-FFH) in the function card identification section 54 that closes the ID section power switch 66. Specifically, the first microprocessor 22 applies a true logic level signal to the ID SELECT control line which extends to the function card 30. This signal activates the ID address decoder 64, which then responds to the presence of the given address signal on card bus 51 by sending a power supply control signal to the ID section power switch 66 which closes to apply power to the ID data registers 68. It is understood that the ID address decoder 64 has power applied to it at all times in order to interpret the control addresses for the power switches. Since the data sent by the processor module over bus 52 at this time are not used by the function card 30, the content of this word of data is unimportant. It should be noted that writing to another specific address in the ID section causes the ID address decoder 64 to open the ID section power switch 66 or similarly control the main section power switch 60. Thus these specific control addresses are used to conserve power and reduce heat generation on the function card 30 by energizing only the section 54 or 56 being accessed by the processor module 20.

Once power has been applied to the ID section 54, the first microprocessor 22 sequentially stores operational information into the write only area of the ID data registers 68. This data provides performance information about the first microprocessor 22 and the processor module 20 in general, so that a sophisticated function card 30 can configure itself for optimal functionality with a given processor module, as will be described. This configurability of the function card 30 enables the device to be used with a number of types of processor modules which utilize different microprocessors and signal timing requirements.

Before describing each byte of operational information which is sent to the function card 30, an overview of the storage location organization within the write only area of the ID data registers 68 will be beneficial. As noted previously, the data buses 24, 34 and 43 within the processor module are sixteen-bits wide, however the storage devices used for the ID data registers 68 may either be eight or sixteen-bits wide. An eight-bit wide storage device is only coupled to the eight least significant bits of the card data bus 52. Thus, data which the first microprocessor 22 applies to the most significant eight bits of the data buses 24 and 52 will not be retained by such ID data registers 68.

In order to accommodate both eight and sixteen-bit registers, each word of data is written to the function card twice. Once in the format as the data is produced within the processor module 20 and again with the bytes of the word swapped. That is, the most significant byte of the first word written becomes the least significant byte of the next word written and the least significant byte of the first word becomes the most significant byte of the second word. Thus, a function card 30 with sixteen-bit wide ID data registers 68 stores the data a word at a time by storing every other data word sent to the card. An eight-bit wide assembly of registers 68 stores the ID data as two sequentially written bytes (i.e. the least significant byte of each data word sent).

Referring to FIGS. 3 and 6, the first microprocessor 22 at step 81 begins storing the operational information within the write only area of the ID data registers 68 on the function card. The first word of operational information contains a designation of the Clock Speed of the communication processor section 21 within the least significant byte, and the most significant byte contains data referred to as "Chip Select Set Up". The Chip Select Set Up data represents the time interval between when the MAIN SELECT signal for the function card 30 goes true and a predefined edge of the next CLOCK signal pulse from the master clock 28. Whether this is a rising or falling edge is indicated by the logic level of a signal on one of the control lines 25 designated PULSE EDGE REFERENCE. One bit of both the least and the most significant bytes of each ID data word designates the odd parity of the remaining bits of that byte.

In order to store the operational information, the first microprocessor 22 applies a true ID SELECT signal to the function card, a write logic level to the READ/WRITE control line, and the address of the desired ID data register onto the address bus. The ID address decoder 64 responds to this sequence of signals by enabling the appropriate ID data registers in the write only area to store the data being sent over the function card data bus 52. The DTACK circuit 69 returns a true DTACK signal to the first microprocessor 22 to complete the transmission.

FIG. 5B shows a memory map of the write only storage area for a card with an assembly of sixteen-bit ID data registers, whereas FIG. 5C is a similar memory map for a card with an assembly of eight-bit ID data registers. For a function card with sixteen-bit wide registers, each byte of the first data word is stored in separate eight-bit wide halves of a first register, these halves have separate logical addresses 00H and 01H in FIG. 5B. As is well understood with respect to a Motorola 68000 microprocessor, the address signal on card address bus 51 selects a pair of register halves and separate UPPER DATA STROBE and LOWER DATA STROBE signals from the first microprocessor 22 individually enable each half of the register.

In the case of a function card with an eight-bit wide assembly of ID data registers 68, the ID address decoder 64 enables only a single storage location for each address which the decoder receives. In this case, the ID data registers 68 are coupled to only the eight least significant bit lines of the card data bus 52 and thus receives only the least significant byte of each data word sent to the card. This is depicted by the memory map of FIG. 5C in which the write only registers store only the data for the odd numbered logical addresses. Thus when the first microprocessor 22 writes the first word of operational information to the function card 30, only the least significant byte of that word, the Clock Speed for address 01H, is stored in the ID data registers 68. As the most significant byte of that word is not needed by the function card, the byte is not retained.

Once the first word of operational information has been written to the appropriate address in the ID data registers 68. The first microprocessor 22 swaps the bytes of that data word at step 83. The swapping process at this time places the Clock Speed data in the most significant byte of a data word and the Chip Select Set Up data in the least significant byte. A register address pointer is incremented at step 84 to access the pair of logical addresses 02H and 03H. The swapped word of operational information then is written to the addressed ID data register on the function card at step 85.

Since a function card with sixteen-bit wide ID data registers 68 already has stored these items of data in registers 00H and 01H, the card does not have registers at logical addresses 02H and 03H, see FIG. 5B. Thus this kind of card does not store the swapped data word. However a function card with eight-bit wide ID data registers has a register at logical address 03H, see FIG. 5C. This latter card stores the least significant byte of the swapped data word, the chip select set up data, in this register. Although an assembly of eight-bit ID data registers only stores the least significant byte of each data word sent to the function card 30, at the completion of this dual word storage cycle this ID data register assembly will contain both items of information sent in the data word, i.e. the clock speed and the chip select set up.

At step 86, the first microprocessor 22 determines whether all of the words of operational information have been written to the function card 30. If additional operational information remains to be written, the execution of the function card initialization routine branches to step 87 where the register address pointer is incremented address of the next sixteen-bit register. Then, the program execution returns to step 81 so that the first microprocessor 22 can obtain the next word of function card operational information from the first RAM 27 to repeat the storage process. The execution of the initialization routine continues to loop through step 81-87 until all of the words of operational information have been stored.

As the process for storing each pair of bytes of operational information is the same, the description of how the remaining bytes are stored will not be described in detail, rather only the content of those bytes will be described. The registers at logical addresses 04H-07H hold only one byte of configuration data with the other byte being unused in the preferred embodiment at this time. However, a register is provided to hold that byte should a use be defined. The data byte stored in the register at logical address 05H is referred to as "Parity/Device Type" and its bits indicate different operational parameters. Specifically, one bit indicates whether the first microprocessor 22 not only generates a parity bit for all bytes written to the main section of the function card 30, but also performs parity checking on all bytes that it reads. Three bits of the Parity/Device Type byte encode the type of microprocessor 22 that is used in the processor module communication section 21. For example, this microprocessor may be a Motorola 68000, 68010 or 68020 model. The designation of the microprocessor is required since the signal timing varies from one device to another. For example, as noted previously, the chip select set up interval terminates at a predefined edge of the system clock following a valid chip enable signal. For a 68000 microprocessor a rising edge of the clock signal is used, whereas the falling edge of the clock signal is used for other types of microprocessors within the 680X0 family. Three other bits of the Parity/Device Type information indicate capacitive load of the local data bus 24 within the processor module 20. The function card 30 may have to take this parameter into account when it determines bus access time, as more time is required the greater the capacitance.

The final class of operational information which is stored in the ID data registers 68 in the preferred embodiment is referred to as "Free Cycle Time". The Free Cycle Time is the amount of time available to the function card in which to drive data valid on the data bus 52 and begins on the next rising or falling system clock edge (as indicated by the "pulse edge reference" signal sent to the card) after the MAIN SELECT signal goes true. The Free Cycle Time is specified by two bytes, a full word, requiring two registers of storage. If the requested data can be driven valid on the data bus 52 by the function card within this free cycle time, the data transfer acknowledge (DTACK) signal can be sent immediately, since the data will be available by the time the first microprocessor 22 requires it. As will be described a high performance function card 30 uses the operational information to determine when to assert the DTACK signal for optimum data exchange efficiency.

Once all of the words of operational information have been stored in the write only area of the ID data registers 68, the execution of the function card initialization routine advances from step 86 to step 90. At this point, the first microprocessor 22 begins to read the data defining each function from the read only ID data registers 75. In order to be consistent with the write cycles to the ID section 54, the first microprocessor performs sixteen-bit read cycles. To accommodate function cards with either eight and sixteen bit ID data registers 68, the function descriptive information is stored at only the odd numbered logical addresses of the data registers. FIG. 5D illustrates how the information for Function 0 is stored in the read only area of a sixteen-bit wide ID data register assembly. For this device the register halves with even logical addresses are empty. Similarly FIG. 5E depicts how the information for Function 0 is stored in the read only area of an eight-bit wide ID data register assembly 68 which only has register locations at the odd logical addresses. Therefore, regardless of the width of these registers the function descriptive information always is carried by the least significant byte lines of the card data bus 52 during each read cycle.

With reference to FIGS. 5D, 5E and 6, the first microprocessor 22 commences reading the function description data at step 90 by resetting its register address pointer to the beginning of the first group of the read only area, i.e. logical address 00H. The first microprocessor then sends a logically true ID SELECT signal and a read logic level on the READ/WRITE line of control lines 25. These signals are received by the function card along with the address of the desired ID data register to be read. In response to these signals, the function card 30 applies the contents of the first two read only storage registers 75 to the data bus 52. In the case of a function card with eight-bit registers, only the contents of the storage location at relative address 01H is applied to the data bus.

The data being read from the function card 30 is transferred through connectors 50 and 37 onto the local data bus 24 of the processor module 20. The first microprocessor 21 obtains this data from the local data bus 24 and transfers it, at step 92, into a region in the first RAM 27 designated to hold access data for each of the functions on the card 30. This area of the first RAM 27 forms a table from which the first microprocessor can quickly obtain the function card information for later use in accessing the different functions.

A test is then made by the first microprocessor 22 at step 93 to determine if the last word of function description data has been read from the ID section 54 of the card 30. If the last word has been read, the initialization routine terminates. Otherwise the card register address pointer is incremented at step 94 and the execution of the initialization routine returns to step 91 to read the next byte of function information from the card. This program execution loop continues until the last byte of function descriptive information has been read from the registers for Function 14 on the function card 30.

As shown in FIGS. 5D and 5E, sixteen byte sized storage locations are allocated to each of the fifteen functions (Functions 0–14) which can be provided on a given function card. The first of these registers, at address 00H, contains information defining the type of the function. The information given by each bit of the "Function Type" byte is defined in Table 1.

TABLE 1

| BIT | FUNCTION TYPE ID BYTE DESCRIPTION |
|---|---|
| 0 | Card Parity<br>0 = Card does not provide parity<br>1 = Card provides parity |
| 1 | Last function terminator<br>0 = No more functions on card<br>1 = Another function on card |
| 2–6 | Type of function<br>00H = Space Between Functions<br>01H = EEPROM<br>02H = Static RAM<br>03H = Communication Circuit<br>04H = Mathematic Co-Processor<br>.<br>.<br>.<br>1DH = Use Extended Type Byte 0<br>1EH = Use Extended Type Byte 1<br>1FH = Use Extended Type Bytes 0 & 1 |
| 7 | Odd parity for bits 0–7 of byte |

In order to reduce cost or save space, function cards may not include circuitry that generates a parity bit for each byte of data that is produced on the card. Bit 0 of the Function Type byte defines whether the associated card function provides a parity bit when data is read by the processor module 20 from the main function card section 56. Bit 1 indicates whether additional functions are defined for the card or whether the current function is the last one. This bit is utilized by the microprocessor 22 to determine how many functions are provided on the card during accesses to the main section 56. Bits 2–6 numerically specify the type of the current function being defined, such as specifying a space function, an EEPROM or a static RAM memory. Additional function types designate non-memory functions, such as the UART 63. The three most significant values (1DH–1FH) for bits 2–6 designate that one or two other bytes of stored data designate the function type instead of this byte. As will be described, these bytes are referred to as Extended Type Byte 0 and Extended Type Byte 1 and enable more function types to be defined than can be done with only one byte. The eighth bit of each function description byte is a parity bit indicating the odd parity of bits 0–7 of the byte.

The next byte of function descriptive data, designated "Maximum Device Speed", indicates which speed microprocessors are compatible with the function card. This speed is stated in terms of the maximum frequency of the CLOCK signal (e.g. 20 MHz.) which can be applied to the first microprocessor 22, as specified by its manufacturer. Many other electrical specifications of the first microprocessor 22, such as address and data setup and hold parameters, are related to its maximum speed. The circuits of a given function card 30 are designed to interface with microprocessors capable of operating up to a certain maximum speed, which maximum speed is specified by the microprocessor manufacturer. Therefore, by knowing the maximum speed (clock frequency) of the microprocessor for which the function circuitry is designed to work, the first microprocessor 22 can determine if it is compatible with the function circuitry.

One bit of the Maximum Device Speed byte can be dynamically set by circuitry on an intelligent function card to indicate incompatibility with the processor module. An intelligent function card changes the state of this incompatibility bit if necessary in response to an examination of the operational information stored in the write only ID registers 74 by the processor module. For example, the function card 30 may determine that the present function can not operate with the specified microprocessor class or at the clock speed of the processor module 20. In most cases, the first microprocessor 22 will determine if an incompatibility issue exists with respect to the card. However, certain cards may have sufficient intelligence to analyze the data written into the ID data register 68 by the processor module and determine an incompatibility problem. The incompatibility bit of a "dumb" function card is permanently placed in a false state to indicate compatibility.

The next byte indicates the amount of address space allocated to the function, referred to as the "Function Size." This parameter is specified in terms of words of address space by three pieces of information, two of which are provided by the function size byte. Bits 0 and 1 of that byte indicate the size of an address block which can have one of four values, for example, as defined in Table 2.

TABLE 2

| | BLOCK SIZE | |
|---|---|---|
| BIT 0 | BIT 1 | BLOCK SIZE |
| 0 | 0 | 1K |
| 0 | 1 | 4K |
| 1 | 0 | 16K |
| 1 | 1 | 64K | where K denotes a numerical value in the thousands. Bits 2-7 of the function size byte specify an Increment Multiplier having a value from one to sixty-four.

The third piece of information needed to determine the size of a function is a Type Size Multiplier derived from the Function Type designation in the first byte of descriptive information at address 01H. The Type Size Multiplier is determined according to the relationships specified in Table 3.

TABLE 3

| TYPE SIZE MULTIPLIER | |
|---|---|
| FUNCTION TYPE | MULTIPLIER |
| SPACE | 8 |
| EEPROM | 8 |
| STATIC RAM | 32 |
| UART | 1 |

The amount of address space allocated to a function is computed by multiplying the block size by the Increment Multiplier by the Type Size Multiplier. For example, an EEPROM with a 4K Block Size and an Increment Multiplier of four has a Function Size of 128K words (4K×4×8). Depending upon the increment multiplier used for this type of EEPROM, the function size can have a range from thirty-two thousand to two million words.

Another characteristic of the function is provided by the byte designated "Function Access Time" which is used by the first microprocessor 22 when transferring data to or from the function card 30. For example, the access time during a read operation is the interval which the microprocessor will have to wait after applying the MAIN CHIP SELECT signal to the card before the microprocessor is assured that the data applied by the card to the data bus 52 is accurate. During a write operation, the microprocessor must apply control signals and data to the function card for the specified amount of time in order to assure that the card circuitry has had time to obtain the data from bus 52. One pattern of bits in the Function Access Time byte specifies that the processor module 20 must wait until it receives a logically true DTACK signal from the function card before removing signals applied to the card.

The remaining two bytes of function descriptive information shown in FIG. 5E are "Extended Type Byte 0" and "Extended Type Byte 1". These provide optional data in which each byte enables 256 more function types to be specified in conjunction with the function type byte. The two extended type bytes used together can specify up to sixty-four thousand different function types.

After all of the function descriptive information has been read from card 30, the first microprocessor 22 examines the data to determine if operation with respect to the function card can continue. If the information read from the function card or its parity are incorrect, or the incompatibility bit has been set in the maximum device speed byte, the first microprocessor now decides if normal operation can begin. If the processor module can not operate with the function card or with a specific function on the card, the first microprocessor 22 notifies the user by transmitting an appropriate error message to terminal 11, shown in FIG. 1.

If the processor module determines that it is able to operate with the function card 30, the first microprocessor 22 writes any byte of data to another specifically defined address in the control address range (relative addresses F0H-FFH) in the function card ID section 54. Writing to this control address causes the ID address decoder 64 to open the ID section power switch 66. Other write operations to a different defined addresses open and close the main section power switch 60 for the main section 56 of the card. The first microprocessor 22 then waits for a short interval to allow the function card hardware to make the transition and stabilize. The processor module 20 can now access the desired functions provided on the function card 30 by applying a true signal to the MAIN SELECT control line, appropriate signals to other control lines and the address and data signals to card buses 51 and 52.

D. Configurable DTACK Circuit

As noted previously, intelligent function cards utilize the data written to the function card by the first microprocessor 22 to adapt their operation to the type of processor module 20 into which they are plugged. One use of this data is to configure the DTACK circuit 69 to minimize or eliminate the number of wait states during processor module access to the card.

The function card 30 shown in FIG. 3 uses a conventional DTACK circuit 69. This kind of circuit generates the DTACK signal after a fixed period of time elapses from when one of the address decoders 58 or 64 is enabled by the appropriate SELECT signal.

Figure 7:
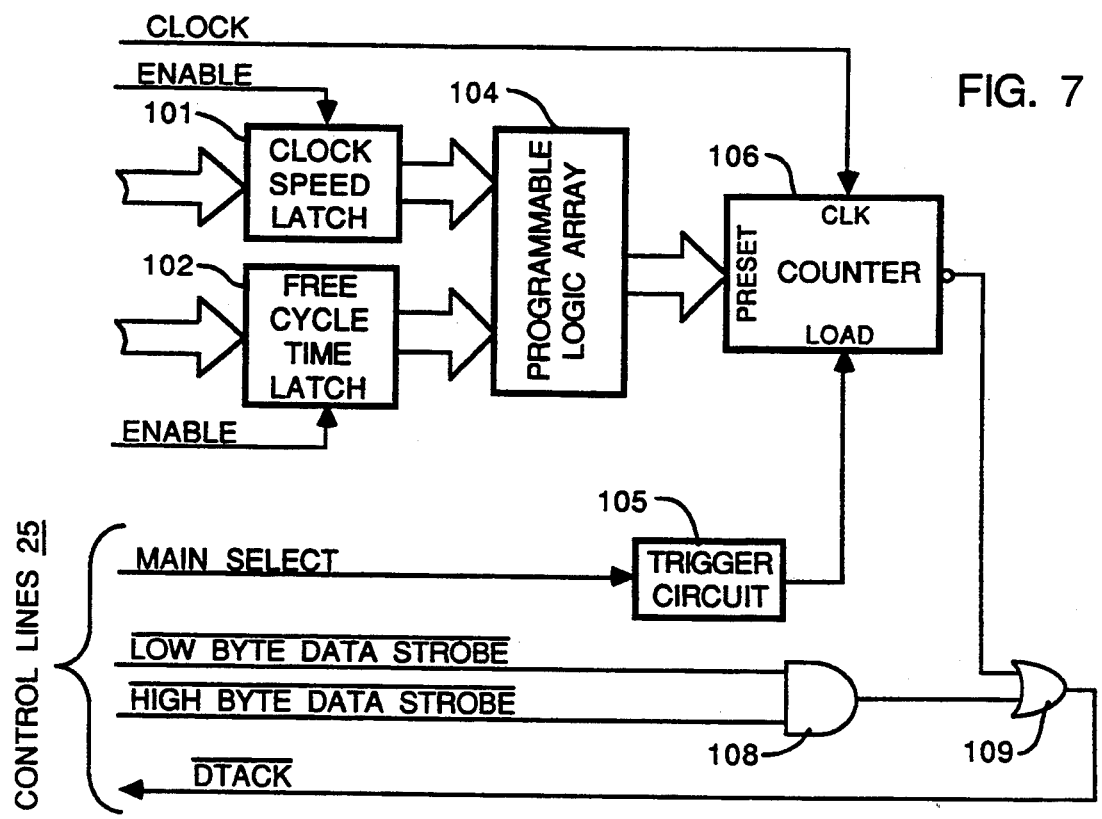
FIG. 7 is a block schematic diagram of an embodiment of the DTACK circuit in FIG. 3.

However, intelligent function cards use the contents of the ID data registers 68 to assert an active DTACK signal at the earliest possible instant at which the card can guarantee that the data eventually will be available when the processor module 20 needs it. The details of the DTACK circuit 69 with this "look ahead" capability is shown in FIG. 7. Two sets of data latches 101 and 102 are coupled to the card data bus 52 on the function card and store the Clock Speed and Free Cycle Time data, respectively, sent by the first microprocessor 22. These data can be stored in the latches by transferring the data from the ID data registers 68 or by the ID address decoder 64, enabling the proper set of latches 101 or 102 during card initialization when the appropriate data is sent over the card data bus 52 by the first microprocessor 22.

The contents of both sets of data latches 101 and 102 are applied to inputs of a programmable logic array (PLA) 104. Alternatively, the programmable logic array can be replaced by a look-up table addressed by the contents of the sets of latches 101 and 102. The programmable logic array subtracts the longest Function Access Time of the functions on the card from the Free Cycle Time. Alternatively, the PLA could be designed to subtract the actual access time for each function as it is being accessed. If the result is non-negative indicating that the Free Cycle Time is that same length of time or longer than the function access time, a zero is sent to counter 106 so that a logically true DTACK signal will be asserted immediately. If the result of the subtraction is negative, the PLA calculates a value according to the following expression:

$$(\text{actual access time} - \text{Free Cycle Time})/\text{CLOCK signal period}$$

The period of the CLOCK signal is derived from the Clock Speed data. The resultant value is rounded up to provide the number of cycles of the CLOCK signal that the card will cause the host to wait (i.e. the number of wait states) before requiring data. Alternatively, if the function card is a type that does not calculate it own DTACK period, the first microprocessor 22 performs this calculation instead.

The output of the programmable logic array, the number of CLOCK signal periods to wait before asserting the DTACK signal, is coupled to inputs of a presettable counter 106. Each time the function card 30 receives a logically true signal on the MAIN SELECT control line, monostable multivibrator 105 is triggered to send a brief pulse to the counter 106 that loads the output of the PLA into the counter. Thereafter, the counter 106 decrements upon each cycle of the CLOCK signal. When the counter 106 reaches zero, a low level signal is sent to one input of OR gate 109. At this time at least one of the LOW or HIGH BYTE DATA STROBES is low which produces a low level from AND gate 108 which is applied to another input of OR gate 109. This combination of signals produces a low level (true) DTACK signal that is sent to the processor module. The DTACK signal goes high when both DATA STROBE signals from the processor module are at high logic levels.

The present intelligent DTACK circuit shown in FIG. 7 is configurable to the Clock Speed and Free Cycle Time of the processor module 20. As a consequence, the card's look ahead capability is adjusted to the type of processor module in which it is plugged. This has the advantage over a non-configurable DTACK circuit 69 in which the look ahead function is preset for a given processor module with specific values for Clock Speed and Free Cycle Time. Thus, if the processor module 20 is improved by using a faster first microprocessor 22, the configurable DTACK circuit 69 still provides optimum look ahead capability and asserts a true DTACK signal at the earliest allowable time for that specific microprocessor.

I claim:

1. A function card for use with a programmable controller, said function card comprising:
   means for electrically connecting the function card to the programmable controller;
   at least one circuit for performing a predefined function;
   means for receiving a first set of data from said means for connecting, wherein the first set of data defines operational characteristics of the programmable controller and specifies a frequency of a clock signal of the programmable controller and a free cycle time interval;
   a means, coupled to said means for connecting, for storing the first set of data and further for storing a second set of data specifying operational characteristics of each of said at least one circuit;
   a data transfer acknowledge circuit which sends an acknowledgement signal to the programmable controller a given interval of time following a request by the programmable controller for access to the function card, in which said data transfer acknowledge circuit utilizes the first set of data specifying the frequency of a clock signal and free cycle time to determine the given interval of time;
   a first control means for enabling said means for receiving data in response to a first signal carried by said means for connecting, and for enabling said means for storing to send the second set of data stored therein to said means for connecting in response to a second signal carried by said means for connecting;
   a second control means for enabling each circuit to exchange data through said means for connecting with the programmable controller in response to other signals carried by said means for connecting;
   a third control means for producing power supply control signals in response to address signals received from the programmable controller via said means for connecting, said third control means producing a first power supply control signal in response to a first address signal, a second power supply control signal in response to a second address signal, a third power supply control signal in response to a third address signal, and a fourth power supply control signal in response to a fourth address signal; and
   an electrical power supply that responds to the first power supply control signal by applying power to energize said circuit, that responds to the second power supply control signal by disconnecting power to deenergize said circuit, that responds to the third power supply control signal by applying power to energize said means for storing information, and that responds to said fourth power supply control signal by disconnecting power to deenergize said means for storing information.

2. The function card as recited in claim 1 wherein each of said at least one circuit for performing a predefined function includes means for altering a manner in which the predefined function is performed in response to the first set of data stored in the means for storing.

3. The function card as recited in claim 1 wherein said second set of data includes data which specifies the defined function, an amount of addresses assigned to the circuit, a maximum frequency of a clock signal for the circuit, and an amount of time necessary for the programmable controller to access the circuit.

4. A function card, for use with a programmable controller, said function card comprising:
   means for connecting the function card to the programmable controller and including a data bus, an address bus and a plurality of control lines;
   a functional section including:
   a) at least one circuit for performing a defined function, and
   b) a first control means for responding to a first set of signals from said means for connecting by enabling each circuit to exchange data through said means for connecting with said programmable controller;
   an identification section including:
   c) a first means, coupled to said means for connecting, for storing data which is sent to the function card by the programmable controller and which defines operational characteristics of the programmable controller,
   d) a second means for storing data regarding operational characteristics of each circuit for performing a defined function, and
   e) a second control means for responding to a second set of signals from said means for connecting by enabling said first means for storing to store data received from said means for connecting, and for responding to a third set of signals from said means for connecting by enabling said second means for storing to send stored data to said means for connecting; and
   a third control means for responding to a fourth set of signals from said means for connecting by controlling the application of power to energize and deenergize said functional section, and for responding to a fifth set of signals from said means for connecting by controlling the application of power to energize and deenergize said identification section.

5. The function card as recited in claim 4 wherein the data received by said first means for storing includes data specifying a frequency of a clock signal of the programmable controller and free cycle time available to the function card.

6. The function card as recited in claim 5 further comprising a data transfer acknowledge circuit which sends a control signal to the programmable controller a given interval of time following a request by the programmable controller for access to the function card, wherein said data transfer acknowledge circuit utilizes said data specifying the frequency of a clock signal and available free cycle time to determine the given interval of time.

7. The function card as recited in claim 4 wherein said second means for storing contains data for each circuit for performing a defined function that specifies the defined function, an amount of addresses assigned to the circuit, a maximum speed for a microprocessor in the programmable controller with which the function card is designed to operate, and an amount of time that the circuit requires to respond to a request from the programmable controller.

* * * * *